United States Patent
Kurashige et al.

(10) Patent No.: US 10,754,168 B2
(45) Date of Patent: *Aug. 25, 2020

(54) ILLUMINATION DEVICE

(71) Applicant: Dai Nippon Printing Co., Ltd., Tokyo (JP)

(72) Inventors: Makio Kurashige, Tokyo (JP); Kaori Nakatsugawa, Tokyo (JP); Shumpei Nishio, Tokyo (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/398,561

(22) Filed: Apr. 30, 2019

(65) Prior Publication Data

US 2019/0265500 A1    Aug. 29, 2019

Related U.S. Application Data

(63) Continuation of application No. 15/523,483, filed as application No. PCT/JP2015/081366 on Nov. 6, 2015, now Pat. No. 10,317,695.

(30) Foreign Application Priority Data

Nov. 7, 2014  (JP) .................................. 2014-227434

(51) Int. Cl.
  *G02B 27/48* (2006.01)
  *F21S 41/00* (2018.01)
  (Continued)

(52) U.S. Cl.
  CPC ............. *G02B 27/48* (2013.01); *B60Q 1/14* (2013.01); *F21S 41/00* (2018.01); *F21V 5/007* (2013.01);
  (Continued)

(58) Field of Classification Search
  CPC ................................ G02B 27/48; F21S 41/16
  See application file for complete search history.

(56) References Cited

U.S. PATENT DOCUMENTS

2008/0187012 A1   8/2008   Yamauchi et al.
2008/0247022 A1   10/2008  Yamauchi et al.
(Continued)

FOREIGN PATENT DOCUMENTS

EP      2 615 502 A1       7/2013
JP      2008-256824 A1     10/2008
(Continued)

OTHER PUBLICATIONS

International Search Report and Written Opinion (Application No. PCT/JP2015/081366) dated Feb. 9, 2016.
(Continued)

*Primary Examiner* — Alexander K Garlen
(74) *Attorney, Agent, or Firm* — Burr & Brown, PLLC

(57) ABSTRACT

An illumination device has a coherent light source, an optical device that diffuses the plurality of coherent light beams and illuminates a predetermined illumination area, and a timing control unit that individually controls incident timing of the plurality of coherent light beams to the optical device or illumination timing of the illumination area, wherein the optical device has a plurality of diffusion regions, the diffusion regions being provided corresponding to the plurality of coherent light beams, the plurality of diffusion regions illuminate the illumination range by diffusion of incident coherent light beams, the plurality of diffusion regions have a plurality of element diffusion regions, the plurality of element diffusion regions illuminate partial regions in the illumination area by diffusion of incident coherent light beams, and at least parts of the partial
(Continued)

regions illuminated by the plurality of element diffusion regions are different from one another.

15 Claims, 9 Drawing Sheets

(51) Int. Cl.

| | | |
|---|---|---|
| B60Q 1/14 | (2006.01) | |
| G02B 3/00 | (2006.01) | |
| G02B 5/02 | (2006.01) | |
| H05B 47/16 | (2020.01) | |
| H05B 47/105 | (2020.01) | |
| F21V 5/00 | (2018.01) | |
| F21V 13/04 | (2006.01) | |
| F21V 14/04 | (2006.01) | |
| G02B 5/32 | (2006.01) | |
| G03B 1/00 | (2006.01) | |
| H04N 5/00 | (2011.01) | |
| B60Q 1/04 | (2006.01) | |
| G03H 1/04 | (2006.01) | |

(52) U.S. Cl.
CPC ............. *F21V 13/04* (2013.01); *F21V 14/04* (2013.01); *G02B 3/0043* (2013.01); *G02B 5/0215* (2013.01); *G02B 5/0252* (2013.01); *G02B 5/0263* (2013.01); *G02B 5/32* (2013.01); *H05B 47/105* (2020.01); *H05B 47/16* (2020.01); *B60Q 1/04* (2013.01); *G03B 1/00* (2013.01); *G03H 1/0402* (2013.01); *G03H 2001/0439* (2013.01); *H04N 5/00* (2013.01)

(56) References Cited

U.S. PATENT DOCUMENTS

| | | | |
|---|---|---|---|
| 2009/0046474 A1 | 2/2009 | Sato et al. | |
| 2010/0020291 A1 | 1/2010 | Kasazumi et al. | |
| 2011/0068910 A1 | 3/2011 | Iwai et al. | |
| 2011/0249460 A1 | 10/2011 | Kushimoto | |
| 2013/0088763 A1* | 4/2013 | Kurashige | G03H 1/0005 359/15 |
| 2013/0170006 A1 | 7/2013 | Kurashige et al. | |
| 2013/0170007 A1 | 7/2013 | Kurashige et al. | |
| 2013/0258689 A1* | 10/2013 | Takahira | F21V 14/00 362/465 |
| 2013/0265561 A1* | 10/2013 | Takahira | F21V 7/06 356/3 |
| 2013/0327966 A1 | 12/2013 | Fidler et al. | |
| 2014/0003070 A1 | 1/2014 | Nakaya | |
| 2014/0362600 A1 | 12/2014 | Suckling et al. | |
| 2015/0137680 A1 | 5/2015 | Komatsu et al. | |
| 2015/0309326 A1* | 10/2015 | Nicholson | G02B 27/48 359/15 |
| 2016/0266545 A1 | 9/2016 | Kurashige et al. | |

FOREIGN PATENT DOCUMENTS

| | | |
|---|---|---|
| JP | 2009-048786 A1 | 3/2009 |
| JP | 2009-169012 A1 | 7/2009 |
| JP | 2010-018165 A1 | 1/2010 |
| JP | 2012-230310 A1 | 11/2012 |
| JP | 2013-184614 A1 | 9/2013 |
| JP | 2013-222058 A1 | 10/2013 |
| JP | 2014-010886 A1 | 1/2014 |
| JP | 2014-511507 A1 | 5/2014 |
| JP | 2014-164108 A1 | 9/2014 |
| JP | 2014-191304 A1 | 10/2014 |
| WO | 2006/137326 A1 | 12/2006 |
| WO | 2012/033174 A1 | 3/2012 |
| WO | 2012/033175 A1 | 3/2012 |
| WO | 2014/024385 A1 | 2/2014 |

OTHER PUBLICATIONS

Japanese Office Action (Application No. 2015-111321) dated Sep. 4, 2015 (with English translation).
Japanese Office Action (Application No. 2015-111321) dated Jan. 15, 2016 (with English translation).
International Preliminary Report on Patentability (Application No. PCT/JP2015/081366) dated May 18, 2017.
Extended European Search Report (Application No. 15856591.1) dated May 17, 2018.
Chinese Office Action (Application No. 201580060030.4) dated Jan. 31, 2019 (with English translation).
Indian Office Action (Application No. 201717015767) dated Nov. 25, 2019.
Extended European Search Report (Application No. 19194310.9) dated Dec. 12, 2019 (in English).
Chinese Office Action (Application No. 201580060030.4) dated Nov. 13, 2019 (with English translation).
Japanese Office Action (Application No. 2019-186204) dated Jun. 23, 2020 (with English translation).

* cited by examiner

ILLUMINATION DEVICE

CROSS REFERENCE TO RELATED APPLICATIONS

This application is a Continuation of U.S. application Ser. No. 15/523,483, filed May 1, 2017, which in turn is the National Stage of International Application No. PCT/JP2015/081366, filed Nov. 6, 2015, which designated the United States, the entireties of which are incorporated herein by reference.

FIELD OF THE INVENTION

The present invention relates to an illumination device that illuminates a predetermined illumination area using a coherent light beam.

BACKGROUND OF THE INVENTION

Since a laser light source has a longer life than a high pressure mercury lamp or the like, the optical system can be downsized, and the power consumption is also small, an illumination device and projection device using a laser light source are spreading.

The laser light source has a problem of speckle generation. However, Patent Literature 1 discloses a technique in which a traveling direction of a laser beam is periodically changed to temporally change the incident angle of a laser beam incident on each point of the illumination zone so as to make speckle less noticeable.

CITATION LIST

Patent Literature

Patent Literature 1: WO 2012/033174 A1

SUMMARY OF THE INVENTION

Technical Problem

In order to change the emission color of the illumination zone illuminated by a laser beam, a plurality of laser beams having different emission wavelength ranges may be superimposed or a laser beam of a specific emission wavelength range may be applied to a fluorescent material to perform wavelength conversion.

However, in the conventional illumination device, it is only possible to switch the emission color only for the entire area illuminated by each laser beam. Therefore, in order to change the color spotwise, it is only necessary to provide a separate laser light source with a small beam diameter, and the configuration of the optical system of the illumination device becomes complicated.

The problems to be solved by the present invention are to provide an illumination device which can arbitrarily change the illumination mode of any area in an illumination area without complicating the configuration of an optical system.

Solution to Problem

In order to solve the above problem, an aspect of the present invention provides an illumination device including: a coherent light source that emits a plurality of coherent light beams, an optical device that diffuses the plurality of coherent light beams and illuminates a predetermined illumination area; and a timing control unit that individually controls incident timing of the plurality of coherent light beams to the optical device or illumination timing of the illumination area; wherein the optical device has a plurality of diffusion regions that respective coherent light beam are incident, the diffusion regions being provided corresponding to the plurality of coherent light beams, the plurality of diffusion regions illuminate the illumination range by diffusion of incident coherent light beams, the plurality of diffusion regions have a plurality of element diffusion regions and the plurality of element diffusion regions illuminate partial regions in the illumination area by diffusion of incident coherent light beams, and at least parts of the partial regions illuminated by the plurality of element diffusion regions are different from one another.

The plurality of coherent light beams emitted from the coherent light source may have different emission wavelength ranges.

The illumination device may include a scanning unit for scanning the plurality of coherent light beams emitted from the coherent light source on the optical device.

The scanning unit may include a light scanning device that periodically changes a traveling direction of the plurality of coherent light beams emitted from the coherent light source.

The light scanning device periodically may scan the plurality of coherent light beams from the coherent light source on an incident surface of the optical device, and the timing control unit may individually control the incident timing of the plurality of coherent light beams to the optical device or the illumination timing of the illumination area in synchronization with a scanning timing of the plurality of coherent light beams by the light scanning device.

The timing control unit may individually control the incident timing of the plurality of coherent light beams to the optical device or the illumination timing of the illumination area in synchronization with a scanning timing of the plurality of coherent light beams by the light scanning device so that an illumination mode of the illumination area is periodically or temporarily changed.

The timing control unit may individually control the incident timing of the plurality of coherent light beams to the optical device or the illumination timing of the illumination area so that an arbitrary selected region in the illumination area and the other region in the illumination area are in different illumination modes.

The timing control unit may individually control the incident timing of the plurality of coherent light beams to the optical device or the illumination timing of the illumination area so that an arbitrary selected region in the illumination area is illuminated with a color different from the other region in the illumination area.

The timing control unit may individually control the incident timing of the plurality of coherent light beams to the optical device or the illumination timing of the illumination area so that in the illumination are, only an arbitrary selected region in the illumination area is not illuminated.

The illumination device may include an object detection unit that detects an object existing in the illumination area, wherein the timing control unit may individually control an incident timing of the plurality of coherent light beams on the optical device or an illumination timing of the illumination area so that a region of the object detected by the object detection unit and the other region in the illumination area are illuminated in different illumination modes.

The illumination device may include an object detection unit that detects an object existing in the illumination area, wherein the timing control unit may individually control an incident timing of the plurality of coherent light beams on the optical device or an illumination timing of the illumination area so that the illumination mode of at least one of the object detected by the object detection unit and the peripheral region of the object is different from the illumination mode of the other region in the illumination area.

The timing control unit may individually control a light emission timing of the plurality of coherent light beams emitted by the coherent light source.

The optical device may be a hologram recording medium, and the element diffusion regions may be element hologram areas that different interference fringe patterns are formed.

The optical device may be a lens array group having a plurality of lens arrays, and the element diffusion regions may include the lens arrays.

Advantageous Effects

According to the present invention, it is possible to provide an illumination device that can arbitrarily change an illumination mode of an arbitrary area in an illumination area without complicating the configuration of the optical system.

DETAILED DESCRIPTION OF THE INVENTION

Figure 1:
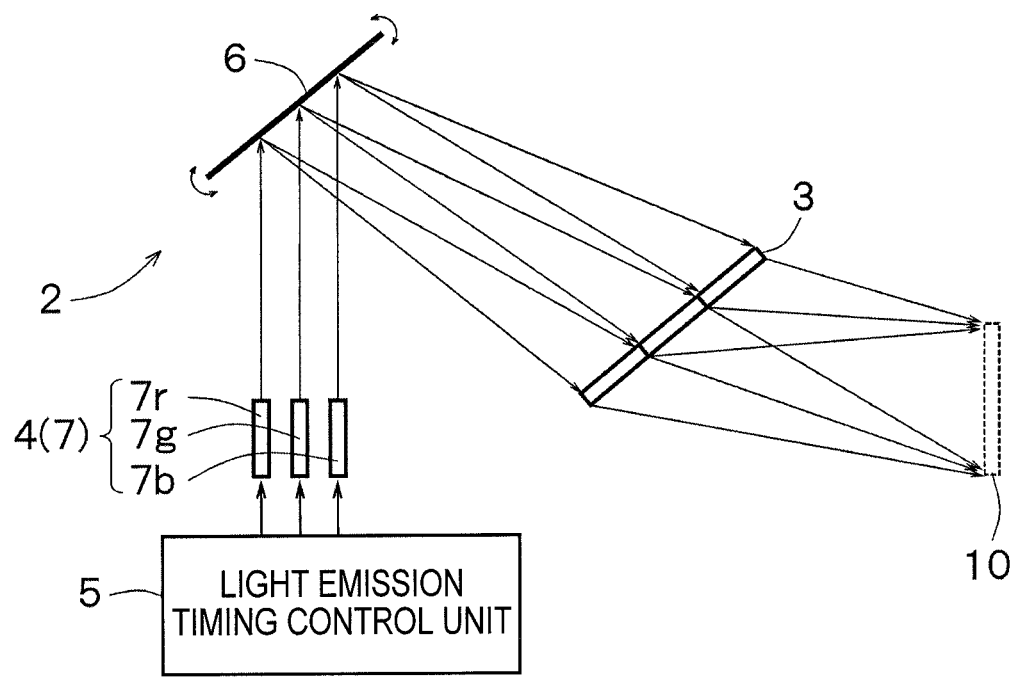
FIG. 1 is a view showing a schematic configuration of an illumination device according to one embodiment of the present invention.

An embodiment of the present invention will be described below with reference to the drawings. In the drawings attached to the present specification, for ease of understanding and ease of understanding, the scales, the dimensional ratios in the length and breadth, and the like are appropriately changed from those of the actual ones and exaggerated.

In addition, terms, geometric conditions and degrees thereof to be used in the present specification, for example, terms such as "parallel", "orthogonal", "same" and the like, values of length, angle and the like are strict shall be interpreted including a range that can expect similar functions without being bound by meaning.

First Embodiment

FIG. 1 is a view showing a schematic configuration of an illumination device 1 according to the first embodiment of the present invention. The illumination device 1 in FIG. 1 includes an irradiation device 2 and an optical device 3. The irradiation device 2 includes the laser light source 4, the timing control unit 5, and a scanning unit 6.

The laser light source 4 has the light source unit 7 that emits a plurality of coherent light beams, that is, laser beams. The plurality of light source units 7 may be provided independently or may be a light source module in which the plurality of light source units 7 are arranged side by side on a common substrate. Hereinafter, an example in which the emission wavelength ranges of a plurality of coherent light beams are different from each other will be mainly described, but the emission wavelength ranges of the plurality of coherent light beams may be the same. In order to make the emission wavelength ranges of a plurality of coherent light beams different from each other, it is sufficient that the laser light source 4 of the present embodiment has at least two light source units 7 having different emission wavelength ranges, and the number of types of emission wavelength ranges may be two or more. In order to increase the emission intensity, the plurality of light source units 7 may be provided for each emission wavelength range.

For example, in the case where the laser light source 4 has a light source unit 7r in a red emission wavelength range, a light source unit 7g in a green emission wavelength range, and a light source unit 7b in a blue emission wavelength range, by overlapping the three laser beams emitted from the light source units 7, a white illumination light beam can be generated.

The timing control unit 5 individually controls the incident timing of the plurality of coherent light beams to the optical device 3 or the illumination timing of the illumination area (illumination zone) 10. In a more specific example, the timing control unit 5 individually controls the light emission timing of a plurality of laser light beams having different light emission wavelength ranges in synchronization with the scanning timing of the plurality of laser light beams by the scanning unit 6. That is, when the plurality of light source units 7 are provided corresponding to a plurality of laser beams having different emission wavelength ranges, the timing control unit 5 controls the light emission timing at which the laser beams are emitted from the plurality of light source units 7 for each light source unit 7. As described above, when the laser light source 4 is capable of emitting three laser beams of red, blue, and green, by controlling the light emission timing of each laser beam, it is possible to generate an illumination light beam of a color in which arbitrary one or more colors of red, blue and green are mixed.

The timing control unit 5 may control the light emission timing from the laser light source 4, the incident timing of the laser beam incident on the optical device 3 may be controlled, or the illumination timing at which the laser beam diffused by the optical device 3 illuminates the illumination area may be controlled. An example in which the timing control unit 5 controls the light emission timing from the laser light source 4 will be mainly described below.

The timing control unit 5 may control whether or not to emit laser beam from each light source unit 7, that is, on/off of light emission, and may switch whether or not to guide the laser beam emitted from each light source unit 7 to the incident surface of the scanning unit 6. In the latter case, an optical shutter unit (not shown) is provided between each light source unit 7 and the scanning unit 6, and the passing/blocking of laser beam is switched by the optical shutter unit.

The scanning unit 6 scans a plurality of laser beams emitted by the light source unit 7 on the optical device 3. The scanning unit 6 may move the light source unit 7 to cause the respective laser beams to scan on the optical device 3, the optical device 3 may be moved so that each laser beam is scanned on the optical device 3, and a light scanning device 6a that changes a traveling direction of the laser beam from the light source unit 7 may be provided so that each laser beam is scanned on the optical device 3. An example in which the scanning unit 6 includes the light scanning device 6a will be mainly described below. The timing control unit 5 synchronizes the scanning timing of the plurality of laser beams by the light scanning device 6a so that the illumination mode of the illumination area periodically or temporarily changes, and controls the light emission timing of each laser beam, the incident timing to the optical device 3, or the illumination timing of the illumination area.

The light scanning device 6a varies the traveling direction of the laser beam from the laser light source 4 with the lapse of time so that the traveling direction of the laser beam does not become constant. As a result, the laser beam emitted from the light scanning device 6a is scanned on the incident surface of the optical device 3.

Figure 2:
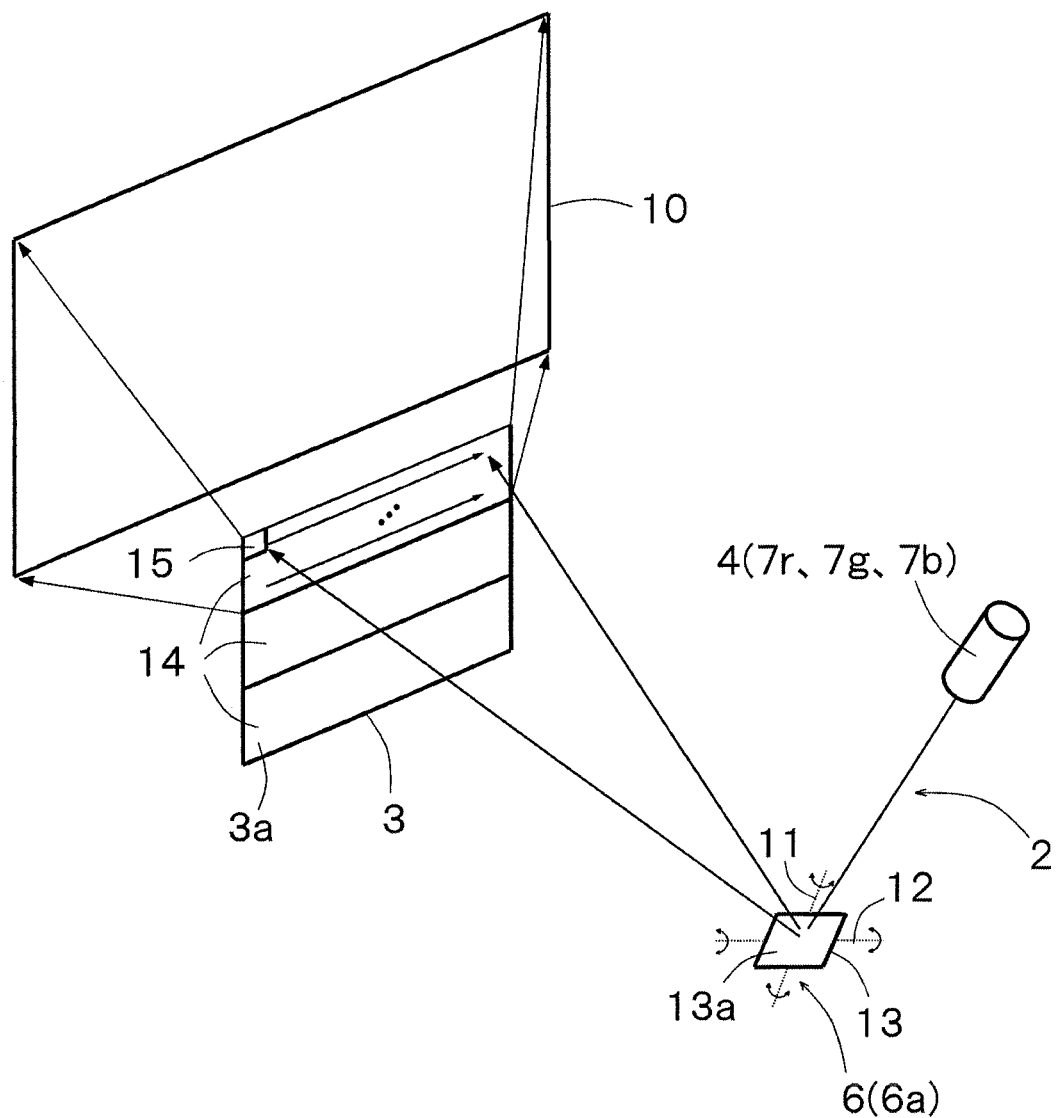
FIG. 2 is a view showing a light scanning device.

As shown in FIG. 2, for example, the light scanning device 6a has the reflective device 13 that is rotatable around two rotating axes 11, 12 extending in mutually intersecting directions. The laser beam from the laser light source 4 incident on the reflecting surface 13a of the reflective device 13 is reflected at an angle corresponding to an inclination angle of the reflecting surface 13a and travels toward an incident surface 3a of the optical device 3. By rotating the reflective device 13 around the two rotation axes 11 and 12, the laser beam is scanned on the incident surface 3a of the optical device 3 two-dimensionally. Since the reflective device 13 repeats the operation of rotating around the two rotation axes 11 and 12 at a constant period, for example, the laser beam is repeatedly two-dimensionally scanned on the incident surface 3a of the optical device 3 in synchronization with this period.

In the present embodiment, it is assumed that only one light scanning device 6a is provided, all of the plurality of laser beams emitted from the laser light source 4 are incident on the common light scanning device 6a, the traveling direction of the light scanning device 6a is changed with the lapse of time, and the optical device 3 is scanned.

The optical device 3 has the incident surface 3a on which the plurality of laser beams are incident, and diffuses the plurality of laser beams incident on the incident surface 3a to illuminate a predetermined illumination area. More specifically, the plurality of laser beams diffused by the optical device 3 passes through the illumination zone 10 and then illuminates an illumination area that is an actual illumination area 20.

Here, the illumination zone 10 is an illumination zone of a near field illuminated by overlapping each diffusion region 14 in the optical device 3. The illumination area of a far field is often expressed as a diffusion angle distribution in an angular space rather than the dimension of the actual illumination zone. In the present specification, the term "illumination zone" includes a diffusion angle area in the angular space in addition to the actual illumination zone (illumination area). Therefore, the illumination area illuminated by the illumination device in FIG. 1 can be a much wider area than the illumination zone 10 of the near field shown in FIG. 1.

Figure 3:
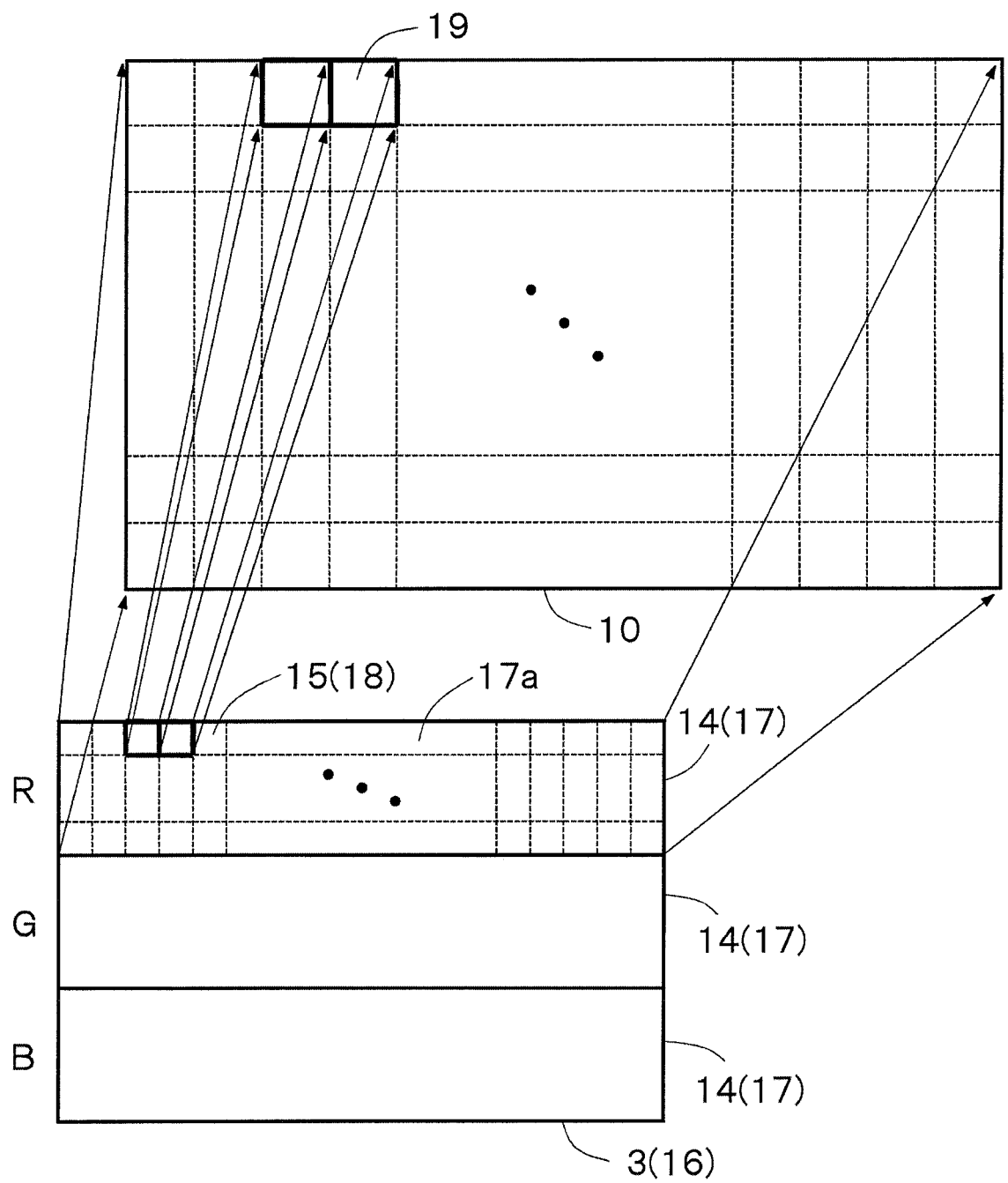
FIG. 3 is a view showing how a laser beam diffused by an optical device is incident on an illumination zone.

FIG. 3 is a view showing how the laser beam diffused by the optical device 3 is incident on the illumination zone 10. The optical device 3 has a plurality of diffusion regions 14 corresponding to the plurality of laser beams. The corresponding laser beam is incident on each diffusion region 14. Each diffusion region 14 diffuses the incident laser beam and illuminates the entire region of the illumination zone 10 as a whole. Each diffusion region part 14 has the plurality of element diffusion regions 15. Each element diffusion region 15 diffuses the incident laser beam and illuminates a partial region in the illumination zone 10. At least a part of the partial region differs for each element diffusion region 15.

The optical device 3 is configured using, for example, the hologram recording medium 16. The hologram recording medium 16 has, for example, as shown in FIG. 3, a plurality of hologram areas 17. Each of the hologram areas 17 is provided corresponding to each of the plurality of laser beams having different emission wavelength ranges. Each hologram area 17 has an incident surface 17a on which the corresponding laser beam is incident. Both of the laser beams incident and diffused on the incident surface 17a of each hologram area 17 illuminate the illumination zone 10. For example, when the hologram recording medium 16 has three hologram areas 17, the laser beam diffused in each hologram area 17 illuminates the entire region of the illumination zone 10.

FIG. 3 shows an example in which three hologram areas 17 are provided in association with three laser beams that emit light beams in red, blue, or green; however, the hologram recording medium 16 according to the present embodiment may have two or more hologram areas 17 in association with two or more laser beams having different emission wavelength ranges. As shown in FIG. 3, when the hologram recording medium 16 has three hologram areas 17 corresponding to three laser beams that emit light beams in red, blue, or green, each hologram area 17 illuminates the entire region of the illumination zone 10, so that when the three laser beams emit light beams, the illumination zone 10 is illuminated with a white light beam.

The size, that is, the area of each hologram area 17 in the hologram recording medium 16 is not necessarily the same. Even if the sizes of the respective hologram areas 17 are different, by adjusting the interference fringe formed on the incident surface 17a of each hologram area 17 for each hologram area 17, each hologram area 17 can illuminate the common illumination zone 10.

Each of the plurality of hologram areas 17 has the plurality of element hologram areas 18. Each of the plurality of element hologram areas 18 illuminates a partial region 19 in the illumination zone 10 by diffusing the incident laser beam. At least a part of the partial region 19 illuminated by each element hologram area 18 is different for each element hologram area 18. That is, the partial regions 19 illuminated by the different element hologram areas 18 are at least partially different from each other.

An interference fringe pattern is formed on an incident surface 17a of each element hologram area 18. Therefore, the laser beam incident on the incident surface 17a of each element hologram area 18 is diffracted by the interference fringe pattern on the incident surface 17a, and illuminates the corresponding partial region 19 on the illumination zone 10. By adjusting the interference fringe pattern variously, it is possible to change the traveling direction of the laser beam diffracted or diffused in each element hologram area 18.

In this manner, the laser beams incident on each point in each element hologram area 18 illuminate the corresponding partial region 19. Further, the light scanning device 6*a* changes incident position and incident angle of the laser beam incident on the respective element hologram areas 18 with the lapse of time. The laser beam incident into one element hologram area 18 illuminates the common partial region 19 even if the laser beam is incident on any position in the element hologram area 18. That is, this means that the incident angle of the laser beam incident on each point of a partial region 19 changes with the lapse of time. This change in the incident angle is a speed that cannot be resolved by the human eye, and as a result, the scattering pattern of the coherent light beam having no correlation is multiplexed and observed in the human eye. Therefore, the speckle generated corresponding to each scattering pattern is overlapped and averaged, and is observed by the observer. As a result, in the illumination zone 10, speckle becomes less conspicuous. In addition, since the laser beam from the light scanning device 6*a* sequentially scans each of the element hologram areas 18 on the hologram recording medium 16, the laser beams diffracted at each point in each element hologram area 18 have different wave fronts. Therefore, since these laser beams are independently superimposed on the illumination zone 10, a uniform illuminance distribution in which the speckle is inconspicuous can be obtained in the illumination zone 10.

FIG. 3 shows an example in which each element hologram area 18 illuminates different partial regions 19 in the illumination zone 10. However, a part of the partial region 19 may overlap the adjacent partial region 19. Further, the size of the partial region 19 may be different for each elementary hologram area 18. Furthermore, it is unnecessary that the corresponding partial region 19 is arranged in the illumination zone 10 according to the arrangement order of the element hologram area 18. That is, the arrangement order of the element hologram area 18 in the hologram area 17 and the arrangement order of the corresponding partial region 19 in the illumination zone 10 are not necessarily coincident.

The illumination device 1 according to the present embodiment performs illumination control to change illumination color of a part of the illumination area illuminated by the laser beam passing through the illumination zone 10 or not to illuminate only a part of the illumination area as necessary.

Figure 4:
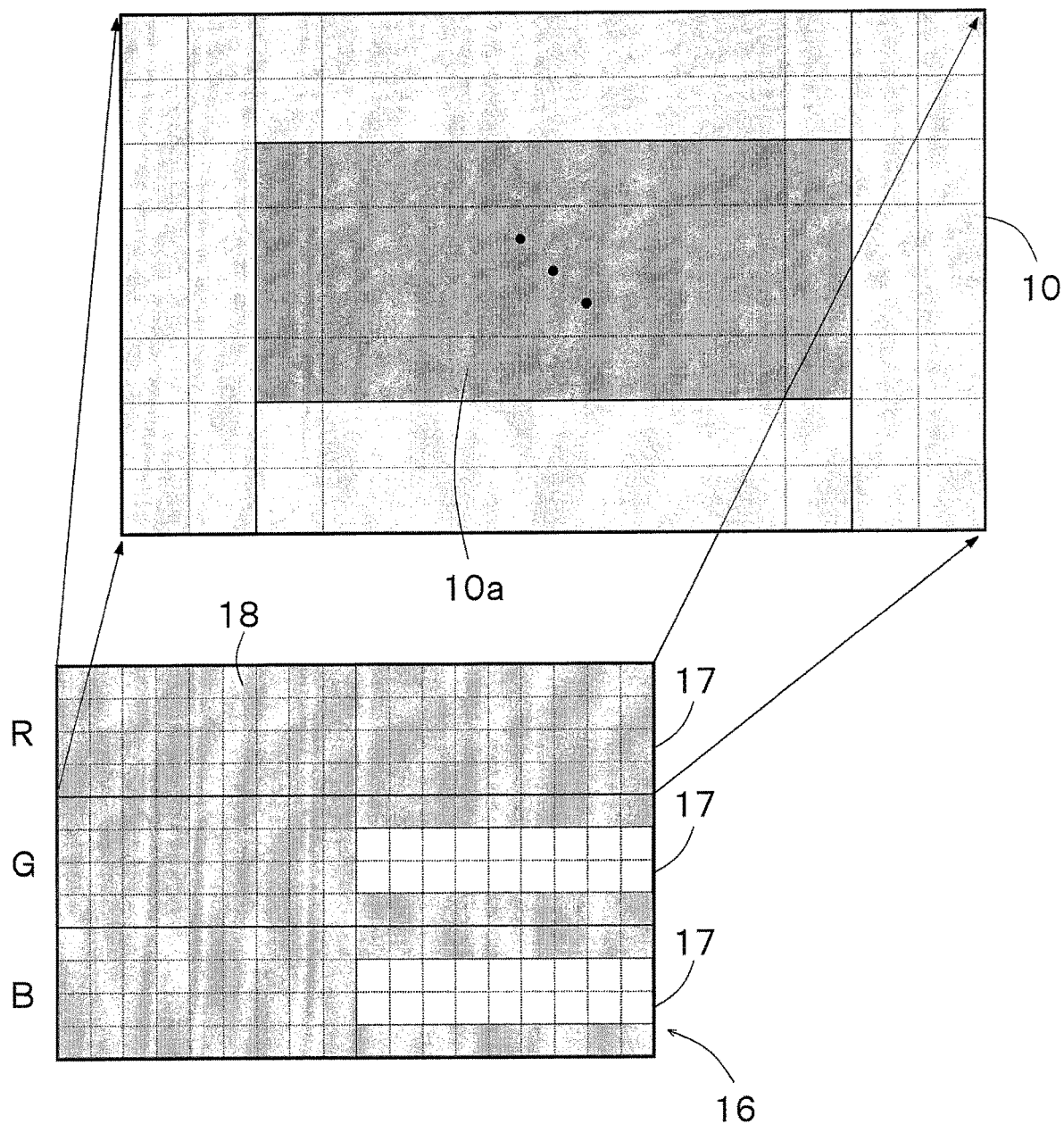
FIG. 4 is a view showing an example in which an illumination color of a central portion in an illumination zone is different from an illumination color of the other portion of the illumination zone.
Figure 5:
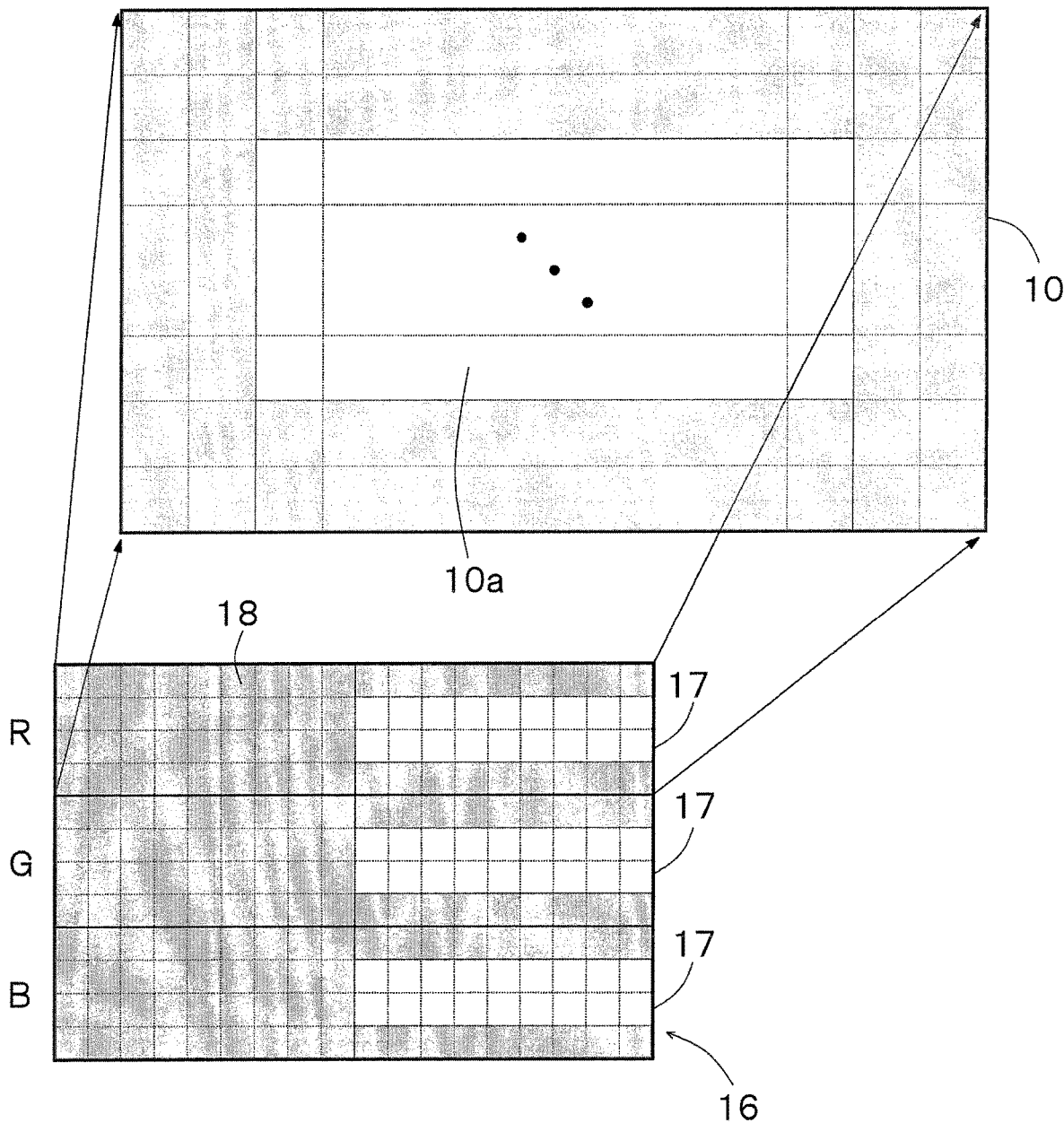
FIG. 5 is a view showing an example in which only the central portion in the illumination zone is made non-illuminated.

FIGS. 4 and 5 show an example in which the illumination mode of the central portion 10*a* in the illumination zone 10 is different from the illumination mode of the other portion in the illumination zone 10. In this case, even also in the illumination area illuminated by the laser beam passing through the illumination zone 10, the illumination mode of the central portion is illuminated differently from the illumination mode of the portion other than the central portion.

In the example of FIG. 4, the hologram recording medium 16 has three hologram areas 17 corresponding to three laser beams that emit light beams in red, green, or blue, in the hologram area 17 for red, the entire region thereof is scanned with the corresponding laser beam, and in the hologram area 17 for green and blue, excluding a part thereof, scanning is performed with the corresponding laser beam. In FIG. 4, in each of the hologram areas 17, a portion where the corresponding laser beam is not scanned is shown in white. These hollow portions correspond to the central portion 10*a* in the illumination zone 10. Since the red laser beam scans the entire region of the corresponding hologram area 17, the red laser beam illuminates the entire region of the illumination zone 10. The green and blue laser beams illuminate the portion other than the central portion 10*a* in the illumination zone 10 in order to scan the portion other than the hollow portion in the corresponding hologram area 17. As a result, the central portion 10*a* in the illumination zone 10 is illuminated in red, and the illumination zone 10 other than the central portion 10*a* is mixed with illumination light beams of red, green and blue and illuminated in white.

On the other hand, in FIG. 5, in any of the three hologram areas 17, a laser beam scans a region other than the region corresponding to the central portion 10*a* in the illumination zone 10. For this reason, the central portion 10*a* in the illumination zone 10 is a non-illumination zone that is not illuminated by any color.

In order to individually control the light emission timing of the three laser beams, by arbitrarily adjusting the light emission timing of the three laser beams, the timing control unit 5 can illuminate an arbitrary place in the illumination zone 10 with an arbitrary color. If the illumination mode inside the illumination zone 10 is arbitrarily adjusted, depending on the illumination mode, it becomes possible to illuminate an arbitrary partial region in the actual illumination area illuminated with the laser beam passing through the illumination zone 10 in an arbitrary illumination mode.

As described above, the colors of the three laser beams may be the same. Even if the colors of the three laser beams are the same, according to the present embodiment, it is possible to arbitrarily change the illumination mode of an arbitrary partial region 10*a* in the predetermined illumination area (illumination zone) 10.

The hologram recording medium 16 can be manufactured by using, for example, a scattered light beam from a real scattering plate as an object light beam. More specifically, when the hologram photosensitive material which is the base of the hologram recording medium 16 is illuminated with a reference light beam and object light beam made of a coherent light beam having coherency with each other, an interference fringe due to interference of these light beams is formed on the hologram photosensitive material, and the hologram recording medium 16 is manufactured. A laser beam which is a coherent light beam is used as the reference light beam, and a scattered light beam of an isotropic scattering plate which is available at low cost, for example, is used as the object light beam.

By illuminating the hologram recording medium 16 with a laser beam from the focal position of the reference light beam used for manufacturing the hologram recording medium 16, a reproduced image of the scattering plate is generated at the arrangement position of the scattering plate which is the source of the object light beam used in manufacturing the hologram recording medium 16. When the scattering plate which is the source of the object light beam used for manufacturing the hologram recording medium 16 has uniform surface scattering, a reproduced image of the scattering plate obtained by the hologram recording medium 16 is also a uniform plane illumination, and a region where the reproduced image of this scattering plate is generated is the illumination zone 10.

In the present embodiment, illumination control is performed by using the optical device 3 so as to change a part of the illumination color in the illumination area or not to illuminate only a part of the illumination area. In order to perform such illumination control using the hologram recording medium 16, the interference fringe pattern formed in each element hologram area 18 becomes complicated. Instead of using an actual object light beam and reference light beam, such a complicated interference fringe pattern can be designed using a computer based on the scheduled wavelength and incident direction of the reconstruction illumination light beam and the shape and position of the image to be reproduced. The hologram recording medium 30 thus obtained is also called a computer generated hologram (CGH). In addition, a Fourier transform hologram having the same diffusion angle characteristic at each point on each element hologram area 18 may be formed by computer synthesis. Furthermore, an optical member such as a lens may be provided on the rear side of the optical axis of the illumination zone 10 to set the size and position of the actual illumination area.

One advantage of providing the hologram recording medium 16 as the optical device 3 is that the optical energy density of the laser beam can be reduced by diffusion, and in addition, another advantage is that since the hologram recording medium 16 can be used as a directivity surface light source, the luminance on the light source surface for achieving the same illuminance distribution can be reduced compared with the conventional lamp light source (point light source). This can contribute to improving the safety of the laser beam, and even if the laser beam having passed through the illumination zone 10 is viewed directly with a human eye, there is less possibility of adversely affecting the human eye as compared with the case of looking directly at a single point light source.

Figure 6:
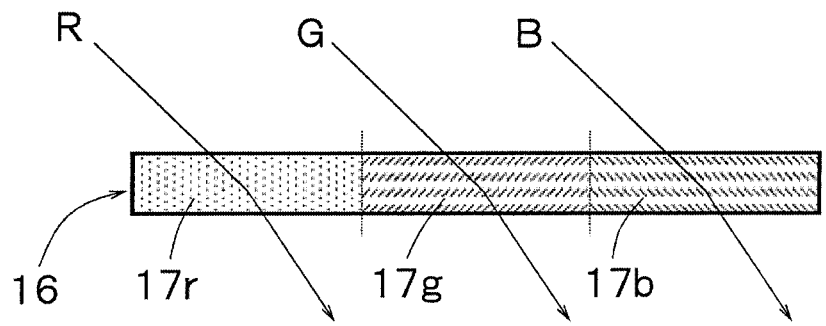
FIG. 6 is a view in which three hologram areas are adjacently arranged along an incident surface of a hologram recording medium.

In the examples shown in FIGS. 1 to 5, the hologram areas 17 for red, green and blue are arranged adjacent to each other along the incident surface of each hologram area 17 as shown in FIG. 6. In FIG. 6, the hologram area for red is denoted by 17r, the hologram area for green is denoted by 17g, and the hologram area for blue is denoted by reference numeral 17b.

Figure 7:
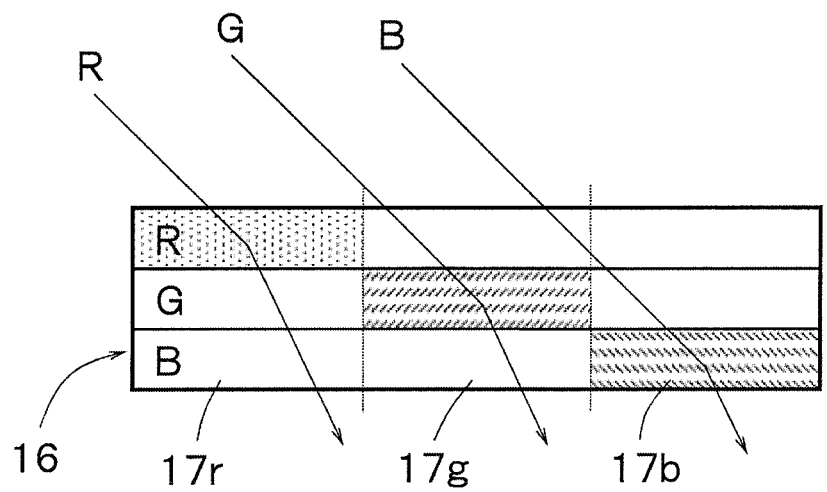
FIG. 7 is a view in which three hologram areas are arranged in a stacking direction.

In this way, in addition to arranging the three hologram areas 17 adjacent along the incident surface, as shown in FIG. 7, the hologram recording medium 16 in which the respective hologram areas 17 are arranged in the stacking direction may be used. In this case, the interference fringe pattern of each hologram area 17 is formed in the layer of each hologram area 17. In order to ensure that the laser beam reaches, without loss as much as possible, from the surface of the hologram recording medium 16 on which the laser beam from the light scanning device 6a is incident to the hologram area 17 on the far side, it is desirable to make the visible light transmittance of each hologram area 17 as high as possible. Further, when the interference fringe pattern is formed at a position overlapping in the stacking direction, the laser beam hardly reaches the layer deeper from the surface. Therefore, as shown in FIG. 5, it is desirable to form the interference fringe patterns in each layer while being shifted in the stacking direction.

FIG. 1 shows an example in which the laser beam from the light scanning device 6a diffuses through the optical device 3, but the optical device 3 may diffuse and reflect the laser beam. For example, when the hologram recording medium 16 is used as the optical device 3, the hologram recording medium 16 may be a reflection type or a transmission type. Generally, the reflection type hologram recording medium 16 (hereinafter, reflection type holo) has high wavelength selectivity as compared with the transmission type hologram recording medium 16 (hereinafter, transmission type holo). That is, even when the interference fringe corresponding to different wavelengths is laminated the reflection type holo can diffract a coherent light beam of a desired wavelength only in a desired layer. Also, the reflection type holo is superior in that it is easy to remove the influence of a zero order light beam. On the other hand, the transmission type holo has a wide diffractable spectrum and a wide tolerance of the laser light source 4. However, when the interference fringe pattern corresponding to different wavelengths is laminated, a coherent light beam of a desired wavelength is diffracted even in a layer other than the desired layer. Therefore, in general, it is difficult to form a transmission type holo with a laminated structure.

As a specific form of the hologram recording medium 16, a volume hologram recording medium 16 using a photopolymer may be used, a volumetric hologram recording medium 16 of a type that performs recording using a photosensitive medium containing a silver salt material may be used, and a relief type (emboss type) hologram recording medium 16 may be used.

The specific form of the optical device 3 is not limited to the hologram recording medium 16, and may be various diffusion members that can be finely divided into the plurality of element diffusion regions 15. For example, the optical device 3 may be configured using a lens array group in which each element diffusion region 15 is a single lens array. In this case, a lens array is provided for each element diffusion region 15, and the shape of each lens array is designed so that each lens array illuminates the partial region 19 in the illumination zone 10. At least a part of the position of each partial region 19 is different. As a result, similarly to the case where the optical device 3 is configured using the hologram recording medium 16, it is possible to change the illumination color of only a part of the illumination zone 10 or to prevent only a part from being illuminated.

FIGS. 4 and 5 show an example in which a part of the illumination in the illumination zone 10 is stopped or a part of the illumination color is changed. However, another method for changing the illumination mode of a part of the illumination zone 10 is conceivable. For example, when the laser light source 4 has a plurality of light source units 7 that emit a light beam in the same emission wavelength range, the light emission of a part of the light source units 7 may be stopped so that the illumination intensity of a part of the inside of the illumination zone 10 is lower than the illumination intensity of the surrounding area. Conversely, a part of the illumination intensity in the illumination zone 10 may be higher than the surrounding illumination intensity. In addition, a part of the inside of the illumination zone 10 may be illuminated with flashing. Alternatively, a part of the color in the illumination zone 10 may be changed continuously or intermittently.

As described above, in the first embodiment, the optical device 3 having the plurality of diffusion regions 14 associated with a plurality of laser beams having different emission wavelength ranges is provided. Each diffusion region 14 has the plurality of element diffusion regions 15. Since each of the element diffusion regions 15 illuminates the partial region 19 in the illumination zone 10, by controlling the timing control unit 5 as to whether or not to irradiate each element diffusion region 15 with a laser beam, it is possible to make the illumination mode of an arbitrary area in the illumination zone 10 different from the illumination mode of other region in the illumination zone 10. For example, it is possible to change the illumination color of an arbitrary area in the illumination zone 10 or to prevent only the arbitrary partial region 19 from being illuminated.

Furthermore, the light scanning device 6a scans laser beam in each element diffusion region 15, and the laser beam incident on each point in each element diffusion region 15 illuminates the entire region of the partial region 19.

Therefore, the incident angle of the laser beam in the partial region 19 in the illumination zone 10 changes with the lapse of time, so that a speckle in the illumination zone 10 is less noticeable.

Second Embodiment

The second embodiment described below changes the illumination mode of the object existing in the illumination zone 10.

Figure 8:
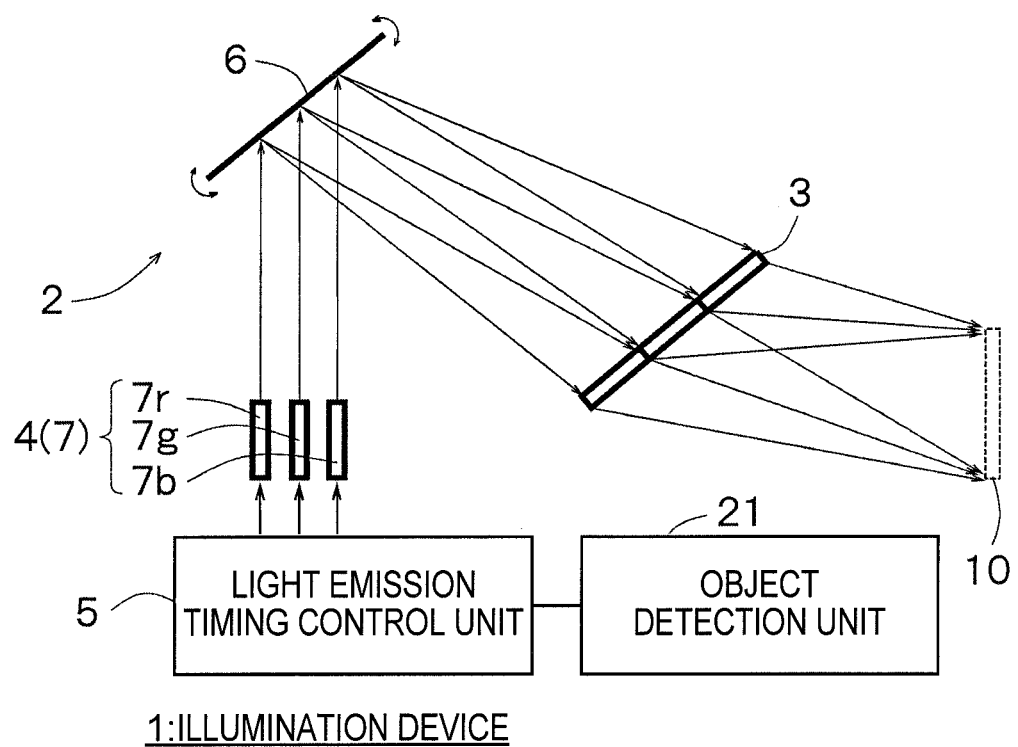
FIG. 8 is a view showing a schematic configuration of an illumination device according to a second embodiment of the present invention.
Figure 9A:
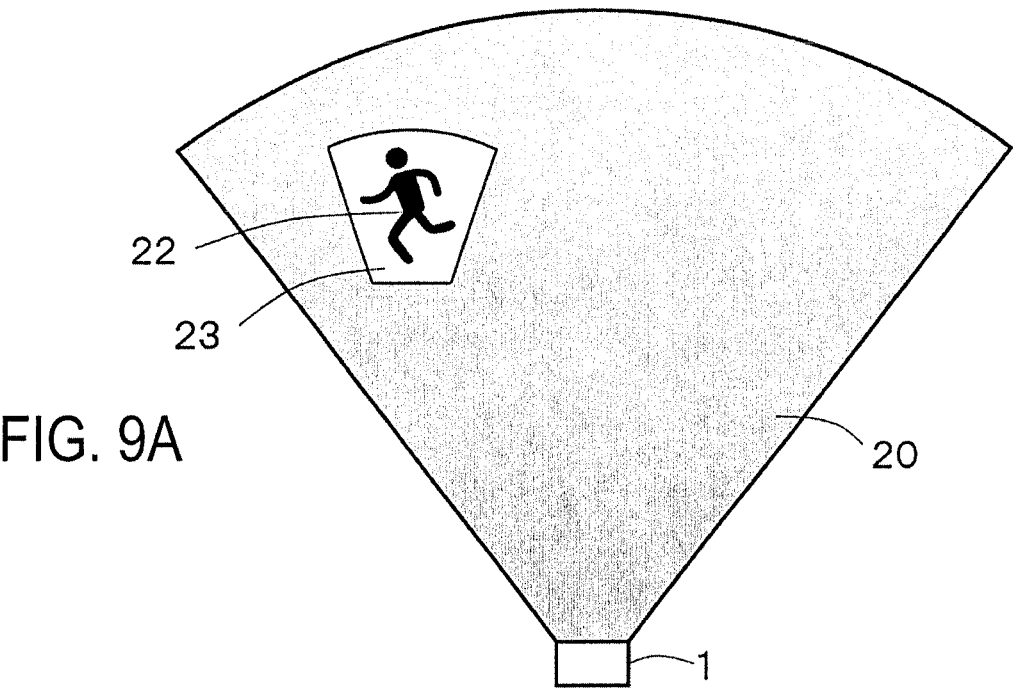
FIGS. 9A and 9B are views showing an illumination area illuminated by the illumination device in FIG. 8.
Figure 9B:
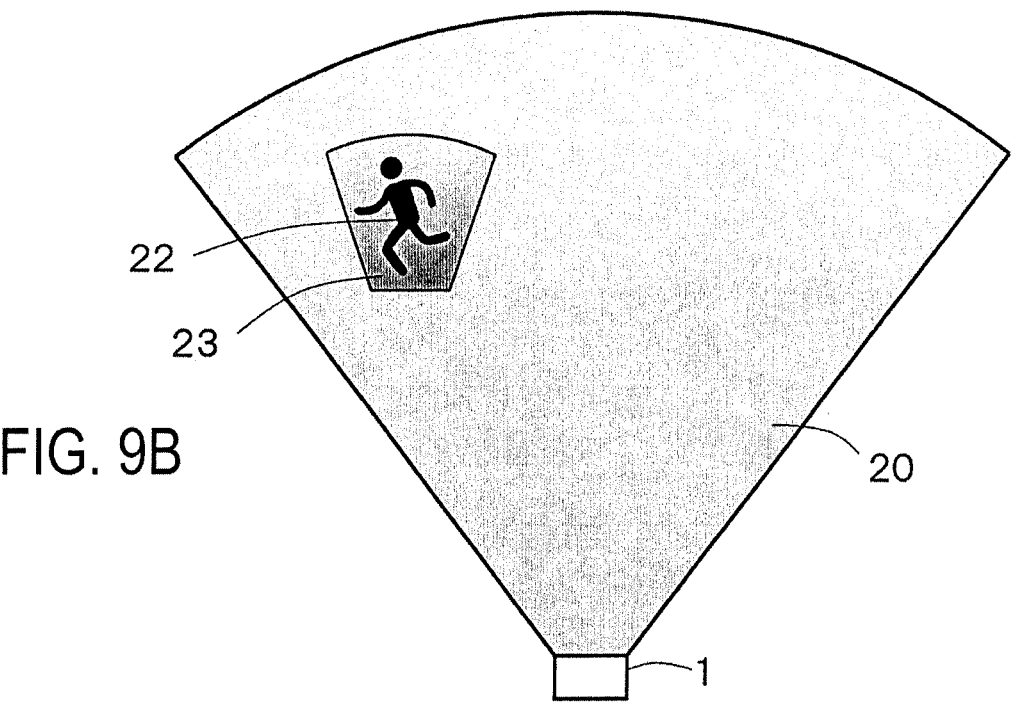

FIG. 8 is a view showing a schematic configuration of the illumination device 1 according to the second embodiment of the present invention, FIGS. 9A and 9B are views showing the illumination area 20 illuminated by the illumination device 1 in FIG. 8. The illumination device 1 in FIG. 8 includes an object detection unit 21 in addition to the configuration of the illumination device 1 in FIG. 1. The object detection unit 21 detects the object 22 existing in the illumination area illuminated by the optical device 3. That is, the object detection unit 21 detects the object 22 existing in the illumination area 20 illuminated by the laser beam passing through the illumination zone 10 in FIG. 8.

The object detection unit 21 may be a sensor that optically detects the object 22. For example, an infrared ray is applied from the sensor to the illumination zone 10, and the presence or absence of the object 22 and the position and size of the object 22 may be detected depending on whether or not the reflected light beam is detected in a predetermined time by the sensor. Alternatively, the image of the illumination zone 10 may be captured by a camera, and the captured image may be analyzed by image recognition such as pattern matching to detect the presence or absence of the object 22 and the position and size of the object 22.

When the object detection unit 21 detects the object 22, the timing control unit 5 controls the light emission timing of the plurality of light source units 7 according to the position and the size of the object 22. More specifically, the timing control unit 5 differentiates the image of the object 22 projected in the illumination zone 10 and the illumination mode of the peripheral region thereof from the illumination mode of the other region in the illumination zone 10. In this way, it is possible to differentiate the illumination mode of the object 22 and the peripheral region of the object 22 from the illumination mode of the other region in the illumination area 20 when the laser beam passing through the illumination zone 10 illuminates the actual illumination area 20.

For example, as shown in FIG. 9A, the timing control unit 5 may perform light emission control not to illuminate the object 22 in the illumination area 20. In this way, when the illumination device 1 in FIG. 9A is, for example, a headlight of a vehicle and the object 22 is a human, it is possible to prevent direct exposure of an illumination light beam to a human so that a person in the illumination area 20 does not feel dazzling by being exposed to head light.

Alternatively, for example, as shown in FIG. 9B, the timing control unit 5 may perform light emission control to illuminate the object 22 in the illumination area 20 with different color. Accordingly, when the illumination device 1 in FIG. 9B is, for example, a headlight of a vehicle and the object 22 is a pedestrian, an oncoming vehicle or the like, it is possible to illuminate the object 22 with a conspicuous color such as red and notify the driver of the existence of the object 22 to call attention of the driver.

Various methods other than the illumination stop of FIG. 9A and the illumination of different colors as shown in FIG. 9B are conceivable as the illumination mode of the object 22. For example, when the laser light source 4 has a plurality of light source units 7 that emit a light beam in the same emission wavelength range, the light emission of a part of the light source units 7 may be stopped so that the illumination intensity of the object 22 is lower than the illumination intensity of the surrounding area. Alternatively, the illumination intensity of the object 22 may be higher than the surrounding illumination intensity. Further, the illumination of the object 22 may be switched to flashing illumination instead of continuous illumination.

As described above, in the second embodiment, the timing control unit 5 controls the light emission timing of the plurality of light source units 7 according to the position and size of the object 22 detected by the object detection unit 21. Therefore, the illumination mode of the object 22 can be changed from the other region in the illumination area 20. This makes it possible to improve the antiglare property of the object 22 and to inform the existence of the object 22 in an easily understandable manner.

Third Embodiment

The third embodiment tracks the object 22 in the illumination area 20. The configuration of the third embodiment is the same as that of FIG. 8, and the object detection unit 21 detects the object 22 in the illumination area 20.

In order to differentiate the illumination mode of a peripheral region 24 of the object 22 in the illumination area 20 from the illumination mode of other region in the illumination area 20, the timing control unit 5 controls the light emission timing of each light source unit 7 of the laser light source 4. As the illumination mode of the peripheral region 24 of the object 22, illumination with a color different from the region other than the peripheral region 24 in the illumination zone 10 may be performed, illumination may be stopped only in the peripheral region 24 in the illumination zone 10, and the flashing illumination may be performed only on the peripheral region 24 in the illumination zone 10.

Figure 10A:
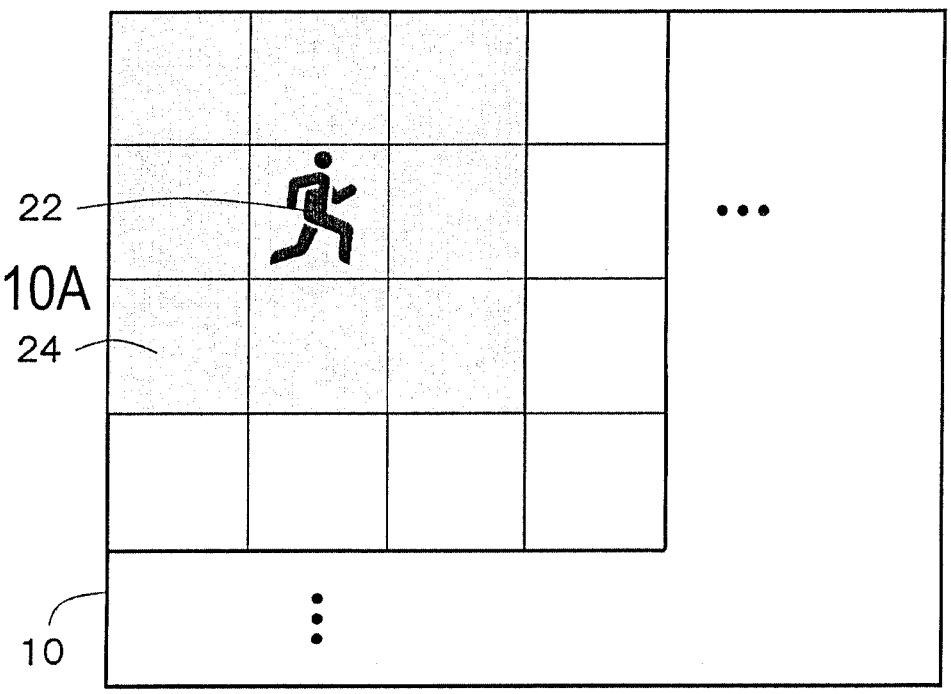
FIGS. 10A and 10B are views each showing an example in which the position of an image of an object projected onto the illumination zone has moved.
Figure 10B:
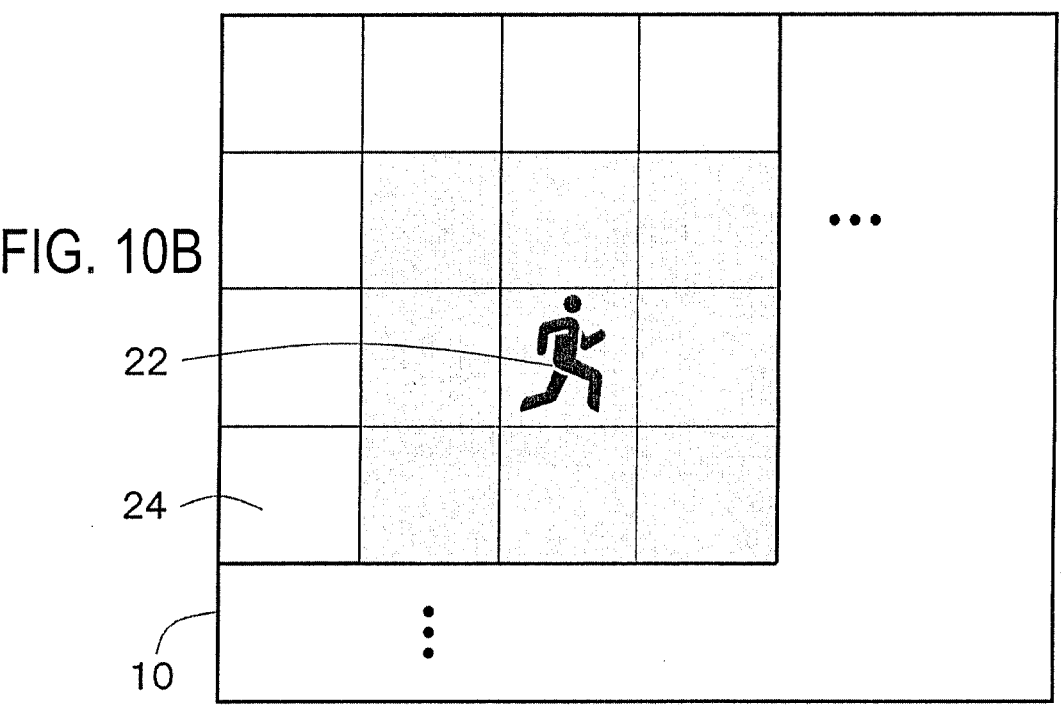

FIG. 10A and FIG. 10B are views each showing an example in which the position of an image of the object 22 projected onto the illumination zone 10 has moved. In accordance with the position of the image of the object 22, the region illuminated with different illumination modes also changes. In this example, the illumination mode of a total of nine partial regions 19 around the partial region 19 including the object 22 is different from the illumination mode of the other illumination zone 10. In FIG. 10A and FIG. 10B, the illumination modes of a total of nine partial regions 19 including the object 22 are illustrated by shadow lines. However, this shadow line indicates that the illumination color is different from the other region or is a non-illumination region.

As shown in FIG. 10A and FIG. B, if the illumination mode of the peripheral region 24 of the image of the object 22 on the illumination zone 10 is made different from the illumination mode of the other area, the illumination mode of the surrounding region of the object 22 existing on the actual illumination area 20 can be made different from the illumination mode of the other region.

The manner of tracking the object 22 is not limited to that shown in FIGS. 10A and 10B. For example, the traveling direction of the object 22 may be detected and only the movement trajectory of the object 22 may be illuminated on the side opposite to the traveling direction from the position where the object 22 currently exists. Conversely, the object 22 may illuminate in all directions in which the object 22 may proceed in the future.

As described above, in the third embodiment, the object 22 in the illumination area 20 is continuously detected and the illumination mode of the peripheral region 24 of the object 22 is differentiated from the other region in the illumination area 20. Therefore, even if the object 22 is moving, it is possible to track the object 22 by illumination. Thus, for example, the moving object 22 can be continuously photographed at night.

The illumination device according to the first to third embodiments may be mounted not only in the vehicle but also in a specific place. In addition, even when mounted on a vehicle, the vehicle is not limited to a car, but may be various moving bodies such as an aircraft, a train, a ship, a diving vehicle and the like.

An aspect of the present invention is not limited to each embodiment described above, but includes various modifications that can be conceived by those skilled in the art, and the effects of the present invention are not limited to the contents described above. That is, various additions, modifications and partial deletions are possible without departing from the conceptual idea and gist of the present invention derived from the contents defined in the claims and their equivalents.

REFERENCE SIGNS LIST

1 Illumination device
2 Irradiation device
3 Optical device
4 Laser light source
5 Timing control unit
6 Scanning unit
6a Light scanning device
7 Light source unit
10 Illumination zone
11, 12 Rotation axis
13 Reflective device
14 Diffusion region
15 Element diffusion region
16 Hologram recording medium
17 Hologram area
18 Element hologram area
19 Partial region
20 Illumination area
21 Object detection unit
22 Object

The invention claimed is:

1. An illumination device comprising:
a coherent light source that emits a plurality of coherent light beams;
an optical device that diffuses the plurality of coherent light beams and illuminates a predetermined illumination area; and
a timing control unit that individually controls incident timing of the plurality of coherent light beams to the optical device or illumination timing of the illumination area so that a first region in the illumination area and a second region different from the first region in the illumination area have different illumination modes, respectively, wherein
the optical device has a plurality of diffusion regions that illuminate the illumination area by diffusing respective coherent light beams, the diffusion regions being provided corresponding to the plurality of coherent light beams,
the plurality of diffusion regions have a plurality of element diffusion regions that illuminate partial regions in the illumination area.

2. The illumination device according to claim 1, wherein the timing control unit individually controls the incident timing of the plurality of coherent light beams to the optical device or the illumination timing of the illumination area so that one of the first and second regions is not illuminated and another of the first and second regions is illuminated.

3. The illumination device according to claim 1, wherein the timing control unit individually controls the incident timing of the plurality of coherent light beams to the optical device or the illumination timing of the illumination area so that the first and second regions are illuminated with different colors.

4. The illumination device according to claim 1, wherein the timing control unit individually controls the incident timing of the plurality of coherent light beams to the optical device or the illumination timing of the illumination area so that the first and second regions have different illumination intensities.

5. The illumination device according to claim 1, wherein the timing control unit individually controls the incident timing of the plurality of coherent light beams to the optical device or the illumination timing of the illumination area so that one of the first and second regions has continuous illumination, and another of the first and second regions has flashing illumination.

6. The illumination device according to claim 1, comprising an object detection unit that detects an object existing in the illumination area, wherein the timing control unit individually controls an incident timing of the plurality of coherent light beams on the optical device or an illumination timing of the illumination area so that the first region where the object exists and the second region have different illumination modes, respectively.

7. The illumination device according to claim 1, comprising an object detection unit that detects an object existing in the illumination area, wherein the timing control unit individually controls an incident timing of the plurality of coherent light beams on the optical device or an illumination timing of the illumination area so that the first region indicating at least one of a region where the object exists and a peripheral region of the object, and the second region have different illumination modes, respectively.

8. The illumination device according to claim 1, wherein the plurality of coherent light beams emitted from the coherent light source have different emission wavelength ranges.

9. The illumination device according to claim 1, further comprising a scanning unit configured to scan the plurality of coherent light beams emitted from the coherent light source on the optical device.

10. The illumination device according to claim 9, wherein the scanning unit comprises a light scanning device that periodically changes a traveling direction of the plurality of coherent light beams emitted from the coherent light source.

11. The illumination device according to claim 10, wherein
the light scanning device periodically scans the plurality of coherent light beams from the coherent light source on an incident surface of the optical device, and
the timing control unit individually controls the incident timing of the plurality of coherent light beams to the optical device or the illumination timing of the illumination area in synchronization with a scanning timing of the plurality of coherent light beams by the light scanning device.

12. The illumination device according to claim 10, wherein the timing control unit individually controls the incident timing of the plurality of coherent light beams to the optical device or the illumination timing of the illumination area in synchronization with a scanning timing of the plurality of coherent light beams by the light scanning device so that an illumination mode of the illumination area is periodically or temporarily changed.

13. The illumination device according to claim 1, wherein the timing control unit individually controls a light emission timing of the plurality of coherent light beams emitted by the coherent light source.

14. The illumination device according to claim 1, wherein
the optical device is a hologram recording medium, and
the element diffusion regions are element hologram areas that different interference fringe patterns are formed.

15. The illumination device according to claim 1, wherein
the optical device is a lens array group comprising a plurality of lens arrays, and
the plurality of element diffusion regions include the lens arrays.

* * * * *